United States Patent
Tucker et al.

(10) Patent No.: US 10,218,942 B2
(45) Date of Patent: Feb. 26, 2019

(54) POSITIONABLE CAMERA

(71) Applicant: Lenovo (Singapore) Pte. Ltd., Singapore (SG)

(72) Inventors: Matthew Ian Tucker, Durham, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/482,751

(22) Filed: Apr. 8, 2017

(65) Prior Publication Data
US 2018/0295328 A1     Oct. 11, 2018

(51) Int. Cl.
| H04N 7/18 | (2006.01) |
| H02J 7/00 | (2006.01) |
| F16B 1/00 | (2006.01) |
| H04N 5/225 | (2006.01) |
| G03B 17/56 | (2006.01) |
| H04N 5/232 | (2006.01) |

(52) U.S. Cl.
CPC ............ *H04N 7/183* (2013.01); *F16B 1/00* (2013.01); *G03B 17/561* (2013.01); *H02J 7/0052* (2013.01); *H04N 5/2252* (2013.01); *H04N 5/2256* (2013.01); *H04N 5/23293* (2013.01); *F16B 2001/0035* (2013.01)

(58) Field of Classification Search
CPC .... G06F 1/1616; G06F 1/1632; G06F 1/1656; G06F 1/161; H04M 1/72527; H04N 7/183; H04N 5/2252; H04N 5/23293; H04N 5/2256; H02J 7/0052; F16B 1/00; F16B 2001/0035; G03B 17/561
See application file for complete search history.

(56) References Cited

U.S. PATENT DOCUMENTS

| 5,438,359 | A | * | 8/1995 | Aoki | H04N 1/00236 |
| | | | | | 348/231.9 |
| 5,475,441 | A | * | 12/1995 | Parulski | H04N 1/2112 |
| | | | | | 348/158 |
| 5,719,799 | A | | 2/1998 | Isashi | |
| 5,748,441 | A | | 5/1998 | Loritz | |
| 5,808,672 | A | * | 9/1998 | Wakabayashi | G06F 3/005 |
| | | | | | 348/220.1 |
| 5,880,928 | A | | 3/1999 | Ma | |
| 6,163,344 | A | * | 12/2000 | Kawamura | H04N 1/0044 |
| | | | | | 348/220.1 |
| 6,427,078 | B1 | * | 7/2002 | Wilska | G06F 1/1616 |
| | | | | | 348/14.02 |
| 6,654,050 | B2 | * | 11/2003 | Karube | G06F 1/16 |
| | | | | | 348/207.1 |
| 6,812,958 | B1 | | 11/2004 | Silvester | |
| 7,477,315 | B2 | | 1/2009 | Shin | |
| 7,489,525 | B2 | * | 2/2009 | Cheng | G06F 1/1616 |
| | | | | | 361/809 |

(Continued)

OTHER PUBLICATIONS

Dual Electronics Corporation, DMH25 Operation Manual, May 2016 (7 pages).

(Continued)

*Primary Examiner* — Shahbaz Nazrul
(74) *Attorney, Agent, or Firm* — Brian J. Pangrle

(57) ABSTRACT

A device can include a processor; memory operatively coupled to the processor; a display operatively coupled to the processor; a camera that includes circuitry that operatively couples to the processor and that includes a mount that positions the camera in a deployed state; and a housing that includes a camera socket that receives the camera in an undeployed state.

20 Claims, 14 Drawing Sheets

(56) References Cited

U.S. PATENT DOCUMENTS

| | | | |
|---|---|---|---|
| 7,911,783 B2 | 3/2011 | Hsieh | |
| 8,253,851 B2 | 8/2012 | Liu | |
| 8,432,485 B1* | 4/2013 | Martinez | H04N 5/2254 |
| | | | 348/207.1 |
| 2002/0013162 A1* | 1/2002 | Whitney | H04M 1/253 |
| | | | 455/557 |
| 2004/0198433 A1 | 10/2004 | Lee | |
| 2004/0246371 A1 | 12/2004 | Cho | |
| 2007/0253703 A1 | 11/2007 | Tsai | |
| 2008/0136973 A1 | 6/2008 | Park | |
| 2009/0322967 A1 | 12/2009 | Liou | |
| 2013/0236192 A1* | 9/2013 | Deicke | G06F 1/1632 |
| | | | 398/135 |
| 2014/0300809 A1* | 10/2014 | Oliveira | H04N 5/232 |
| | | | 348/376 |

OTHER PUBLICATIONS

HP, Ic100w, Mini WiFi Cam, User Manual, Nov. 2014 (52 pages).

Sony, Advantage of the CMOS Sensor, May 2011 (8 pages).

Lazar et al., LI-FI Design for High Speed Data Transmission, ARPN Journal of Engineering and Applied Sciences, vol. 10, No. 14, Aug. 2015 (5 pages).

Jeffries, Lenovo Ideacentre AIO Y910 Review and Ratings, Jan. 17, 2017, Computer Shopper, accessed online http://www.computershopper.com/desktops/reviews/lenovo-ideacentre-aio-y910 (Apr. 8, 2017) (17 pages).

Texas Instruments, TMS320DM642 Digital Media Processor, Technical Overview, Application Report SPRU615—Sep. 2002 (43 pages).

* cited by examiner

POSITIONABLE CAMERA

TECHNICAL FIELD

Subject matter disclosed herein generally relates to technology for computing or other devices.

BACKGROUND

Various types of devices, display devices, computing and display devices, etc. exist that can be defined in part by a form factor such as, for example, a smartphone form factor, a tablet form, a laptop form factor and/or another type of form factor. As an example, a device can include one or more hinge assemblies that allow for orienting one portion of the device with respect to another portion of the device. For example, a display housing of a device may be oriented with respect to a keyboard housing of a device via one or more hinge assemblies.

SUMMARY

A device can include a processor; memory operatively coupled to the processor; a display operatively coupled to the processor; a camera that includes circuitry that operatively couples to the processor and that includes a mount that positions the camera in a deployed state; and a housing that includes a camera socket that receives the camera in an undeployed state. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
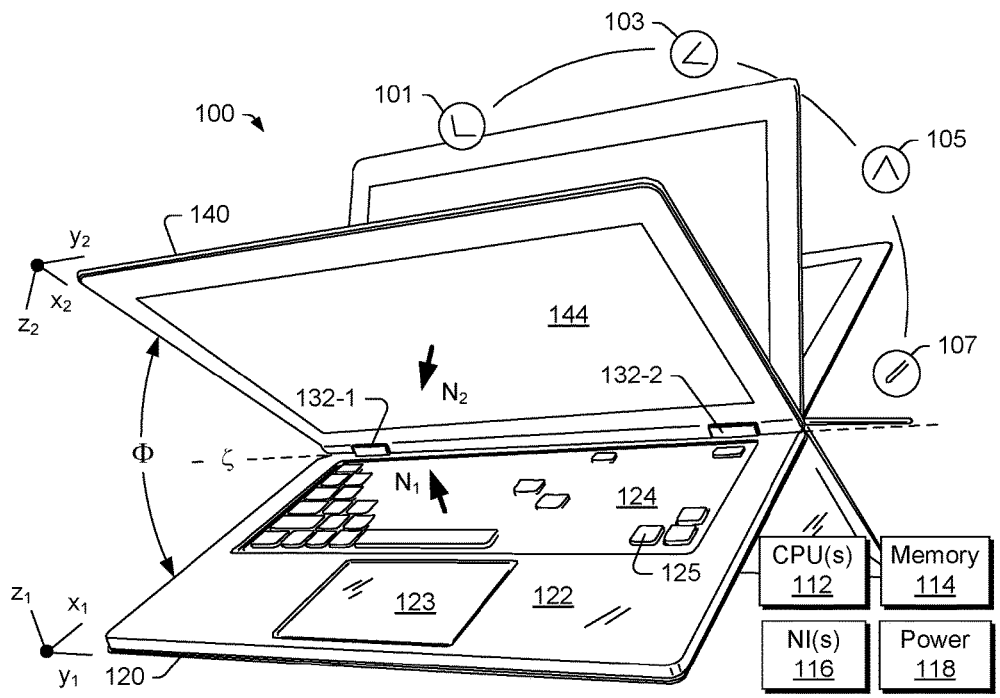
FIG. 1 is a diagram of an example of a device.
Figure 1:
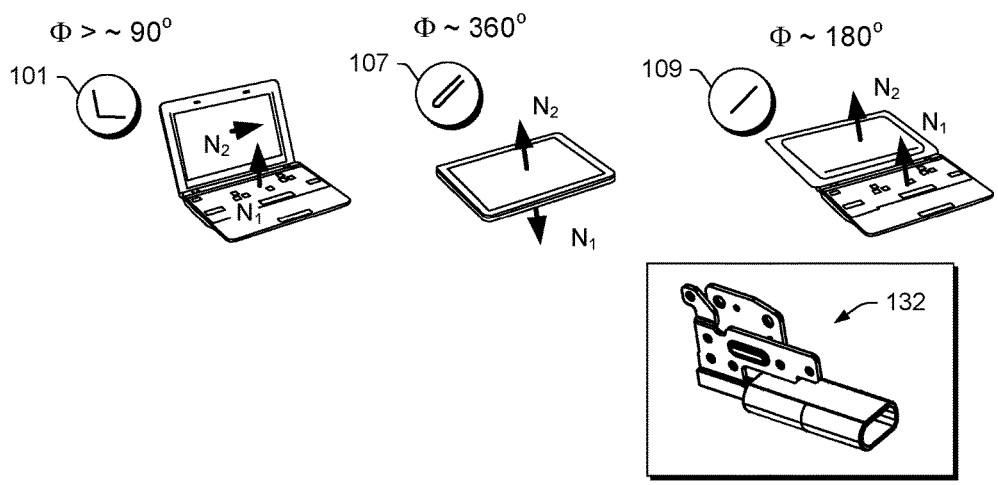

FIG. 1 shows an example of a device 100 that includes a keyboard housing 120 and a display housing 140 that are pivotable with respect to each other via movement about one or more hinges 132-1 and 132-2 (e.g., hinge assemblies). An example of a hinge assembly 132 is shown in a perspective view where the hinge assembly includes two saddles and a housing that covers gears that mesh two axles where one of the axles is connected to one saddle (e.g., a keyboard housing saddle) and where another one of the axles is connect to the other saddle (e.g., a display housing saddle). The hinge assembly 132 may allow for 0 degree to 360 degree orientation of the housings 120 and 140, for example, the hinge assembly 132 as shown may correspond to a closed clamshell orientation of the housings 120 and 140 or to a tablet orientation of the housings 120 and 140. The device 100 may be a device such as, for example, a computing device (e.g., an information handling device). The device 100 may be described by a form factor and referred to as a laptop computer or a notebook computer (e.g., a "laptop" or "notebook"). As an example, a display carried by a display housing may be described by a diagonal dimension, which may be, for example, a diagonal dimension in a range from about 10 cm to about 50 cm.

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and

109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. As an example, the device 100 may include a single hinge that allows for pivoting a keyboard housing with respect to a display housing such that keys of the keyboard housing can be oriented to face a back side of a display. In such an approach, a user may spin the keyboard housing by 180 degrees about a central axis of the single hinge (e.g., an axis orthogonal to the axis and then rotate the keyboard housing such that the keys face the back side of the keyboard in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

A device can include a processor; memory operatively coupled to the processor; a display operatively coupled to the processor; a camera that includes circuitry that operatively couples to the processor and that includes a mount that positions the camera in a deployed state; and a housing that includes a camera socket that receives the camera in an undeployed state. For example, the device 100 can include a camera that includes a mount that can position the camera in a deployed state where the display housing 140 includes a mounting surface that cooperates with the mount of the camera and where the keyboard housing 120 includes a camera socket that receives the camera in an undeployed state. When the camera is in the undeployed state, the camera may be referred to as being garaged in the keyboard housing 120 (e.g., a housing can be a garage for storage of a camera). As to the circuitry of the camera, it can be or can include data transmission circuitry. For example, the circuitry of the camera can be wired data transmission circuitry or wireless data transmission circuitry. As an example, circuitry of the camera can include wired and wireless data transmission circuitry. As an example, circuitry of a camera can be selectively operatively coupled to a processor. For example, a processor can be housed in a display housing, a keyboard housing, etc. where the housing includes circuitry that can be selectively operatively coupled the processor and selectively operatively coupled to the camera. In such an example, the circuitry can be data transmission circuitry for use in the deployed state of the camera and/or can be data transmission circuitry for use in the undeployed state of the camera. As an example, in the undeployed state of the camera, data transmission circuitry may be disabled to prohibit data transmission from the camera to a processor of a device. Such a scenario may be defined as a secure state. Such data transmission circuitry may be disabled, for example, by one or more of an air gap between electrical contacts, a switch, etc.

As an example, a camera can be incapable of acquiring images in an undeployed state. For example, when a user desires privacy, the user may transition a camera from a deployed state to an undeployed state (e.g., a garaged state) where, in the undeployed state, the camera is not capable of acquiring images. In such an example, the camera may be one or more of electrically disconnected from circuitry of a device (e.g., a computing device, a keyboard housing, etc.) and covered in a manner where a lens (e.g., an aperture) of the camera cannot acquire images (e.g., full field of view images). As an example, in an undeployed state, a camera may be oriented such that a lens (e.g., an aperture) of the camera faces in a particular direction such as, for example, toward a bottom side of a keyboard housing. As an example, upon transitioning from an undeployed state to a deployed state, a camera may be positioned such that a lens (e.g., an aperture) of the camera is oriented to acquire images of a user of a keyboard housing (e.g., a keyboard housing of a laptop computing device).

As mentioned, as an example, a camera can include an "air gap" in an undeployed state. For example, in an undeployed state an air gap may exist between an interface or interfaces of the camera and an interface or interfaces of a keyboard housing. Thus, in the undeployed state, the camera may be immune from hacking (e.g., illicit control of a camera at least in part by processor execution of malicious code). As an example, a camera may provide a user with a complete security option where the user has confidence about the camera, because when the camera is not in use, it is garaged inside a keyboard housing (e.g., of a laptop computer) without an ability to view the outside world.

Where a camera is carried by a keyboard housing, a display housing may be camera free (i.e., without a camera) or, for example, the display housing may include a back facing camera that does not face a user that is in front of a display of the display housing. In such examples, a display housing can include a display that is bezel-less or that has a bezel that is less than about 5 percent a surface area of a front side of a display housing where a display surface area is about 95 percent or more. Such an approach can help to minimize inactive areas around a display. When such "black border" areas are large, a laptop may be perceived as being old-fashioned and/or low quality; whereas, if the borders around a display are small, the laptop may be perceived as being modern and/or high quality. Narrow borders can allow for a larger display to fit in a smaller laptop body (e.g., display housing), which can improve portability (e.g., display size with respect to housing size).

As an example, a camera in a keyboard housing of a laptop computer can alleviate inclusion of a camera mounted in a region above a display of a display housing. Where a camera is present in a region below a display of a display housing, particularly garaged in a keyboard housing of a laptop, a thin border may be utilized in a region above a display of a display housing. For example, a display may extend to within a few millimeters of an upper edge of a display housing (e.g., consider about 5 mm or less or about 3 mm or less). In such an example, the display may extend to within a few millimeters of a side edge of a display housing (e.g., consider about 5 mm or less or about 3 mm or less).

As an example, a camera may be utilized for acquiring video (e.g., videography) and/or still images (e.g., photography). A camera fixed in place in a bezel area above a display of a display housing of a laptop can be ill-suited or awkward for use in taking a picture of a subject that is not a user of the laptop as the user would have to pick up the laptop and rotate it 180 degrees away from himself so that the display is also pointing away from him. In such an orientation, aiming the camera and adjusting settings can be impractical (e.g., awkward, inconvenient, etc.). As an example, a positionable camera may be oriented in a direction that allows a user to keep the display of the laptop facing towards the user while viewing a subject or scene to be captured, while adjusting one or more settings or otherwise interacting with a touchscreen display, etc. For example, a positionable camera may be positioned to point a lens (e.g., an aperture) of the positionable camera away from the user instead of towards the user. In such a manner a user can photograph subjects or scenes that are in front of her, while keeping the display pointed toward her.

A positionable camera that can be garaged in a camera socket of a device may avoid the inclusion of a camera in a display housing of the device where a lens (e.g., an aperture) of the camera faces a user that is in front of a display of the display housing.

A laptop may have a display housing that is camera-less. For example, a display housing may be free of a front facing camera and/or a back facing camera. As an example, a laptop can include a keyboard housing that includes a camera that can be garaged in a camera socket and removed from the camera socket to be positioned and oriented to face a user in front of a display of a display housing of the laptop and, alternatively, can be positioned and oriented to face away from the user while the user may, if desired, view what the camera sees on the display. As an example, such a camera may be referred to as a positionable camera that can be the only camera of a laptop.

As an example, a positionable camera may be utilized for videograph (e.g., video conferencing, etc.) and/or photography (e.g., taking photographs). As an example, a camera can be included in a laptop proximate to a hinge that operatively couples a display housing and a keyboard housing of the laptop where, for example, the camera is carried by the keyboard housing (e.g., within a few centimeters of the hinged ends of the housings). In such an example, the camera may be disposed in a camera socket of the keyboard housing. As another example, a camera may be disposed in a camera socket at a different location, which may be distal from a hinge (e.g., consider a front edge camera socket or a side edge camera socket that is more than about 5 cm from a hinge edge of a housing). While a keyboard housing is mentioned, a display housing may include a camera socket that can garage a positionable camera. As another example, a tablet housing may include a camera socket that can garage a positionable camera. As yet another example, a smart phone may include a camera socket that can garage a positionable camera.

As an example, a method can include storing a positionable camera in a camera socket in a housing of a laptop. In such an example, the positionable camera can be extracted from its garaged position when use of the camera is desired. As an example, a camera may include an adjustment mechanism that can be used to adjust the camera's viewing angle. For example, such a mechanism may be used to adjust a camera's viewing angle in relation to a user of the laptop and/or, for example, to allow the camera to be aimed at one or more subjects that may be behind the laptop (e.g., on an opposite side of the laptop from a user). For example, a camera can include a hinge, a swivel, etc. that may separate a mount portion of the camera from a light aperture portion of the camera.

For a laptop that can fold approximately 360 degrees into a tablet mode, a camera that is positionable can, for example, enable videography and/or photography while the laptop is in the tablet mode (see, e.g., the orientation 107 of FIG. 1).

As an example, where a camera is garaged inside a housing of a laptop, a tablet or a smartphone, it can be in a state that has no view of the outside world and, for example, in a fail-safe privacy state.

A camera in a laptop may be a locked-in-place camera that is integrated into a display housing. Where a camera is positionable, it may be positioned in one or more manners for one or more uses. With a removable garaged camera, for example, a receptionist who needs to photograph a visitor to create an ID could remove the camera from a camera socket of her laptop, point it at the visitor, and take the picture, while the laptop's screen may remain pointed at the receptionist. Or, for example, while videoconferencing with a classmate, a student could move the camera down to aim at a textbook illustration on the table next to his laptop, to show the textbook illustration to those he is video conferencing with. As an example, a laptop user could also use the removable garaged camera to take a picture of a subject or scene that is to her right or left, such as a sunset that is outside a window next to her. Such examples are not readily possible with a locked-in-place camera, which may entail moving the entire laptop.

As an example, a laptop (e.g., laptop computer) can include a camera that is stored inside a housing of the laptop and that is removable for use when the camera is needed.

As to mounting of a camera, a housing of a computing device (e.g., a laptop, a tablet, a smartphone, etc.) can include one or more magnetic materials that can cooperate via magnetic force with one or more magnetic materials in the camera. For example, a display housing can include a bezel region that includes one or more magnetic materials so that a camera can snap magnetically onto the bezel to be held in a relatively fixed position while the camera is in use. As an example, one or more magnets may be configured so that while a camera is being held by magnetic attraction onto a bezel of a laptop, an angle of the camera can be changed without disrupting the magnetic attachment to the bezel. For example, a camera may include two portions joined by a barrel hinge where a magnetic material is included in one of the portions that can be positioned with respect to another magnetic material while the other portion may be adjusted via the barrel hinge.

As an example, a camera can include wireless communication circuitry that can transmit information to one or more devices, which can optionally include a computing device that includes a socket for the camera. In such an example, the camera and the computing device include wireless communication circuitry such as, for example, WIFI® communication circuitry, BLUETOOTH® communication circuitry, optical communication circuitry and/or another type of communication circuitry.

As to optical communication circuitry, consider, as an example, Li-Fi communication circuitry, which may utilize various protocols (e.g., one or more IEEE 802 protocols). Light utilized in Li-Fi can include light that is in the visible portion of the electromagnetic spectrum.

As an example, optical communication circuitry may implement one or more optical orthogonal frequency-division multiplexing (O-OFDM) modulation techniques, which may be optimized for data rates, multiple-access and energy efficiency.

As an example, optical communication circuitry may utilize a physical layer (PHY, consider PHY 1, PHY 2, PHY 3, etc.) and a media access control (MAC) layer to provide data rates sufficient to transmit audio, video and/or other information. As an example, optical communication circuitry may be linked with one or more other layers. As an example, optical communication circuitry may implement a TCP/IP protocol.

As an example, a camera can include a rechargeable battery. Such a battery may be rechargeable via physically connection to a charger and/or via wireless connection to a charger. As an example, a physical connection may be via a cable or a socket of a computing device.

As an example, a camera may include one or more ports that can provide for transmission of information, power or power and information. As an example, a port may be or include a serial bus. For example, consider one or more of an IEEE 1394 standard serial bus and a Universal Serial Bus (USB) standard serial bus.

As an example, as to a port or ports, a camera can include one or more male and/or female connectors that are operatively coupled to interface circuitry. For example, a camera can include a female connector that can receive a male connector, which may be at an end of a cable. As an example, a camera can include a male connector that can be plugged into a female connector. As an example, a camera can include a male connector and a female connector or, for example, two female connectors.

As an example, a camera may be utilized in a port pass through mode. For example, consider a camera disposed in a socket of a computing device where the camera includes an exterior facing female socket. In such an example, a user may plug a male socket into the female socket where circuitry within the camera is connected to circuitry of the computing device. In the port pass through mode, the camera may function as a passive element. As an example, a camera may operate as an active element. For example, a camera may include circuitry that can process data, which may be data received from an image sensor, a microphone, etc. of the camera or, for example, information received via a port of the camera (e.g., wired and/or wireless).

Where a camera includes non-volatile memory (e.g., consider a secure digital (SD) card, etc.), which may optionally be removable from the camera, information may be transferred to and/or from the non-volatile memory via one or more ports of the camera. As an example, a port may be a wireless port that operates via wireless communication circuitry. For example, information stored in a SD card that is disposed in an SD card socket of a camera may be transmitted wirelessly or, for example, via wire. As an example, a camera that can be received in a socket of a computing device may be utilized as an information storage device (e.g., a thumb-drive), whether it is in the socket of the computing device or removed from the socket of the computing device.

As an example, a port may be a USB Type-C specification port. Such a port may utilize a reversible-plug connector. As an example, a port may be a LIGHTNING® specification port or a THUNDERBOLT® specification port.

As to the USB Type-C specification port, a connector can include 24-pins in a double-sided arrangement that can provide four power-ground pairs, two differential pairs for USB 2.0 data bus, four pairs for SuperSpeed data bus, two "sideband use" pins, $V_{CONN}$+5 V power for active cables, and a configuration pin for cable orientation detection and dedicated biphase mark code (BMC) configuration data channel.

As an example, a cable, a computing device and/or a camera may allow for mixed types of connectors (e.g., interfaces). For example, a USB Type-C to USB Micro-B cable (e.g., or device) may allow for connecting a USB Type-C port with a USB Micro-B port (e.g., consider a camera, a smartphone, a tablet, etc. that includes one of those USB port types).

As mentioned, a camera can include a battery, which may be a rechargeable battery that can charge via contacts or induction, optionally while the camera is stored inside a computing device (e.g., a smartphone, a laptop, a tablet, etc.).

As an example, a camera may be removed from a socket of a computing device and be physically un-tethered from the computing device to allow the camera to be positioned freely, whether within the wireless communication range of the computing device for communications or whether further than wireless communication range where storage of information (e.g., audio and/or video) may be to memory of the camera (e.g., non-volatile memory, etc.).

As an example, a camera may be tethered to a computing device and/or a battery or other power supply device. As an example, a camera may be tethered via a cable. As an example, a cable may provide for transfer of audio and/or video information and/or power. Where a camera is physically attached to a computing device via a cable, it may avoid loss or misplacement of the camera. As an example, a camera can include location circuitry. For example, a computing device can include a locator application that can be executed to transmit a signal to a camera such that the camera issues a notification such as an audio notification (e.g., via a speaker), a vibrate notification (e.g., via a vibrator) and/or a visual notification (e.g., via an LED). Such an approach may help a user locate the camera. In such an example, the camera may be active to acquire images and/or audio that may assist a user in locating the camera (e.g., where the images and/or audio may be transmitted to a computing device wirelessly and rendered by the computing device via a display and/or speaker(s)).

As an example, a method can include removing a camera from a socket of a computing device such as a socket in a housing of a laptop and pointing the camera in a desired direction. In such an example, the camera may be in a hand-held mode where circuitry of the camera and/or the computing device may include image stabilization circuitry that acts to reduce the effect of unsteady hand movement. As an example, a camera can include a mount that can be utilized to position the camera on a surface, which may be a surface of a housing of a laptop. As an example, a mount can be a mechanical mount (e.g., a hook, a clip, etc.) and/or a magnetic mount (e.g., a magnet that can provide an attraction force to magnetic material such as another magnet and/or a magnetic material such as iron or one that includes iron).

As an example, a deployed positionable camera can be utilized to acquire an image or images such as, for example, video (e.g., a time series of images). As an example, a camera can optionally include processing circuitry that can implement one or more compression algorithms and/or one or more decompression algorithms. As an example, a camera may include rendering circuitry that can output information for rendering to a display. For example, a camera may include a High-Definition Multimedia Interface (HDMI) port that can be coupled to a display device where the camera may be controllable to cause rendering of imagery (e.g., live and/or stored in memory) to a display of the display device. For example, such a camera may be plugged directly or indirectly via a cable to a display device (e.g., a monitor, a television, etc.) where a remote control may allow for control of the camera with respect to rendering information to a display of the display device. In such an example, the remote control may be a computing device that includes a socket for storage of the camera. For example, a laptop can include a housing that includes a socket that receives the camera for storage. In such an example, a user may remove the camera from the socket of the housing of the laptop, plug the camera into a display device and then control rendering of imagery and optionally audio from the camera to a display of the display device.

An HDMI is a type of audio/video interface for transmitting video data and/or digital audio data from an HDMI-compliant source device, such as a display controller, to a compatible computer monitor, video projector, digital television, or digital audio device.

As an example, a camera may include wireless display circuitry. For example, a camera may include MIRACAST® wireless display circuitry and a plug such as an HDMI plug. The MIRACAST® circuitry can employ a peer-to-peer architecture and send video and audio (e.g., 1080p HD video (e.g., H.264 codec) and 5.1 surround sound). A wireless connection may be established via WPS and may be secured with WPA2. As an example, IPv4 may be used on an Internet layer and, on a transport layer, TCP or UDP may be used. As to an application layer, as an example, a stream may be initiated and controlled via RTSP, RTP for data transfer.

As an example, after a camera is removed from a socket of a laptop and held in a user's hand, the camera can be pointed at the user of the laptop for video conferencing, or it can be pointed away from the user of the laptop to photograph something behind the laptop. As an example, such a camera could be pointed down to take a picture of a page on a table. As user may move a camera around freely, for example, to record a video of a car driving past on the road near where the user is, or to take a panoramic photograph of the environment.

As an example, when a camera is magnetically attached to a bezel of a housing of laptop, the camera can include an adjustment mechanism that allows a view angle of the camera to be adjustable. In such an example, the adjustable angle can be more flexible compared to a camera that is locked in relation to a display. For example, with an adjustable angle positionable camera, a user can set a display housing at one angle to avoid glare and set the camera at a different angle to aim directly at his or her face. As an example, a camera may be independent angled while being mounted to a display housing. For example, a display may define one plane and a camera sensor array may define another plane where the plane of the camera sensor can be adjustable as to its angle with respect to the plane of the display.

As an example, when a camera is in a stored orientation, in an undeployed state, a computing device can include charging circuitry that charges a rechargeable battery in the camera. In such an example, the charging circuitry may monitor the charge state of the rechargeable battery. As an example, a computing device can include memory management circuitry that can determine characteristics of memory of a camera, whether the camera is in a deployed state or in an undeployed state. As an example, non-volatile memory in a camera may be displayed as a drive by an operating system (e.g., via a file system). For example, a graphical user interface rendered to a display of or operatively coupled to a computing device may include "Camera (F:)" as a selectable drive.

As an example, a camera that can be stored in a socket of a housing of a computing device may be operable as one or more of a drive, a wireless display dongle, a media player (e.g., remotely controllable), and a passive and/or an active port pass through.

Figure 2:
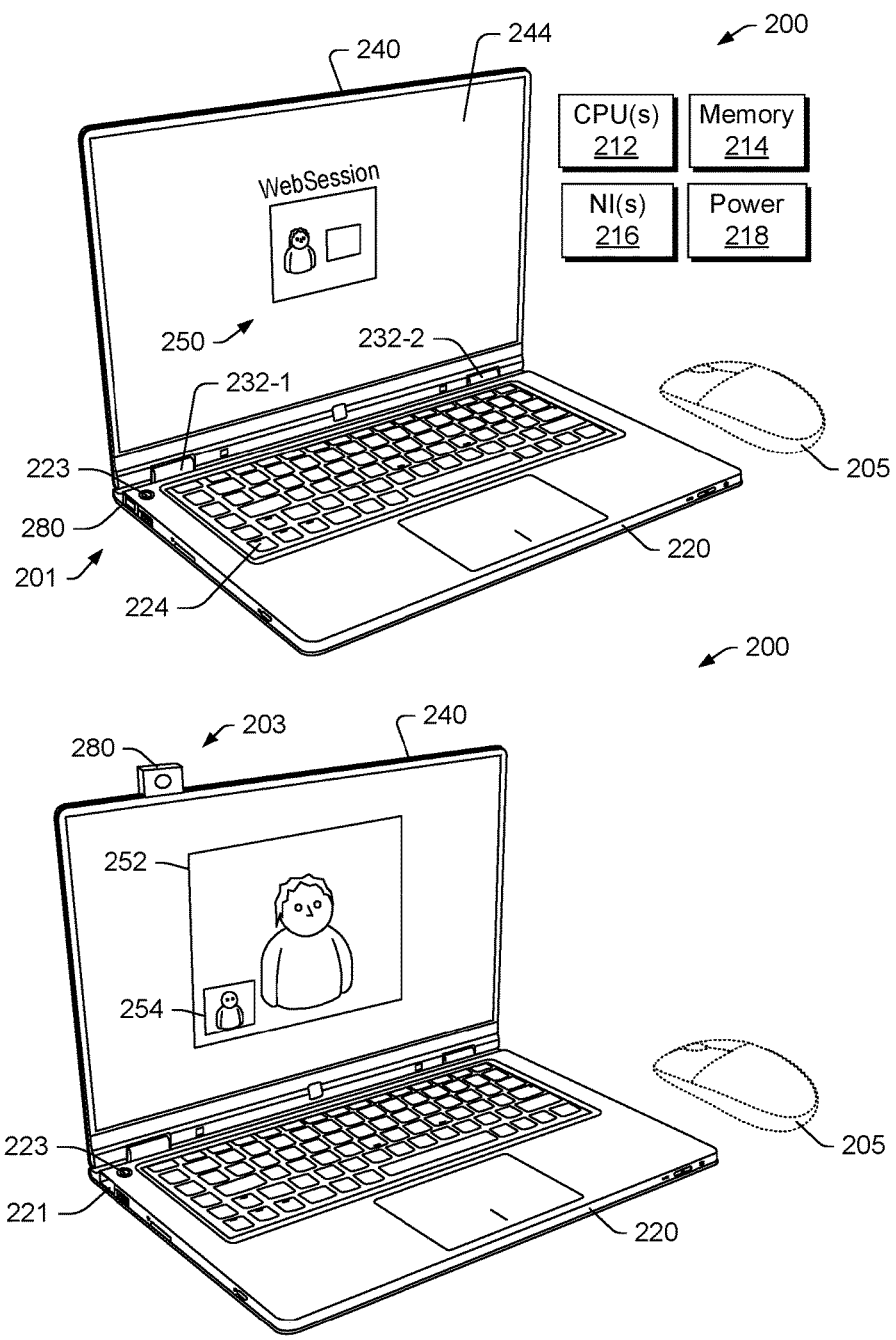
FIG. 2 is a diagram of an example of a device and examples of states of a positionable camera of the device.

FIG. 2 shows an example of a device 200 that includes a processor 212 or processors, memory 214 accessible by the processor 212 (e.g., or one or more processors); a display housing 240 that includes a display 244 operatively coupled to the processor 212 (e.g., or one or more processors); a keyboard housing 220; a first hinge assembly 232-1 and 232-2 that operatively couples the keyboard housing 220 to the display housing 240; and a positionable camera 280 that is shown as being in an undeployed state 201 in a camera socket 221 of the keyboard housing 220 and as being in a deployed state 203. In the example of FIG. 2, the positionable camera 280 can be operatively coupled to the processor 212 (e.g., or one or more processors) and, as an example, may be optionally decoupled therefrom. For example, in the undeployed state 201, the positionable camera 280 may be decoupled from one or more circuits of the device 200, which can include, for example, one or more of a circuit for power, a circuit for control, a circuit for data transmission or another type of circuit associated with operation of the positionable camera 280.

In FIG. 2 one or more coordinate systems may be utilized to describe one or more features (see, e.g., FIG. 1). As an example, the positionable camera 280 may include an adjustment mechanism such as a hinge such that, in the deployed state 203, an angle of view of the positionable camera 280 can be adjusted.

In the example of FIG. 2, the display 244 includes graphics 250 rendered thereto as associated with an application such as a videoconferencing application that may initiate a "web session" (e.g., a session implemented at least in part through use of the World Wide Web and/or the Internet). In the example of FIG. 2, the display includes images 252 and 254 (e.g., rendered in a graphical user interface) that are associated with a videoconferencing application where the image 254 may be an image of a user of the device 200 as captured via the positionable camera 280 in the deployed state 203.

As an example, the positionable camera 280 may be actuated automatically by circuitry of the device 200. For example, upon receipt of a meeting request and acceptance of the meeting request, the positionable camera 280 may automatically transition from an inactive or stand-by state to an active state (e.g., that includes acquiring images and/or audio, via a microphone of the camera or a microphone of the device 200.

As an example, the positionable camera 280 may be operatively coupled to a mechanism that may be motorized, spring-loaded, etc. that causes the positionable camera 280 to extend in response to a signal associated with acceptance of a meeting request. As an example, where a user of the device 200 initiates a meeting (e.g., via instructing the device 200 to transmit a meeting request via one or more of the one or more network interfaces 216), the positionable camera 280 may be automatically extended at least in part from the camera socket 221 of the keyboard housing 220. For example, a graphical user interface associated with a videoconferencing application may include one or more graphical controls that can be selected via a point device such as a mouse 205, a touchpad, a touch of a touchscreen display, etc., to cause the positionable camera 280 to transition from the undeployed state 201 to an extended state, which may be extended a distance away from the keyboard housing 220 that is sufficient for a user to grasp with her fingers (e.g., consider an extended state having a distance of approximately a centimeter for gripping between two fingers).

As an example, the housing 220 can include a release mechanism 223 that can be actuated to cause the positionable camera 280 to transition from the undepolyed state 201 to an extended state. Such a release mechanism may include one or more of a button, a latch, etc. that can be manipulated to cause the positionable camera 280 to transition. Such a release mechanism may reset once the positionable camera is inserted into the camera socket 221 of the keyboard housing 220. As an example, a release mechanism may include a latch that can secure a camera in a camera socket of a housing in an undeployed state where, for example, a side of the camera may be visible from a side of the housing that includes the camera socket. The camera socket may include a spring where the camera can be inserted into the camera socket to cause the spring to compress and where the latch sets against the camera (e.g., in a keeper or other feature) to secure the camera in the camera socket. In such an example, depression of a button, etc., may cause the latch to move such that the compressed spring converts potential energy to kinetic energy to translate the camera outwardly a distance such that the camera is removed (e.g., ejected) or can be grasped for removal from the camera socket. As another example, a release mechanism can be a push mechanism where pushing the camera into the camera socket from a deployed state causes a spring to compress and a latch to be set to secure the camera in the camera socket and where pushing the camera into deeper into camera socket in an undeployed state causes the spring to compress and the latch to be released such that the camera is at least partially ejected from the camera socket.

As an example, a graphical control may be rendered to the display 244 that is operatively coupled to a mechanism that can control at least one state transition of the positionable camera 280. For example, a user may click on the graphical control (e.g., or touch the graphical control) and the device 200 may actuate a mechanism to extend the positionable camera 280 outwardly from the keyboard housing 220. Such a transition may also activate the positionable camera 280 for video and/or still image capture (e.g., and optionally audio).

As mentioned, the device 200 may be interacted with using an input device such as the mouse 205. As shown in FIG. 2, the mouse 205, if present, may be located to the right-hand side of the device 200. Such an arrangement may be common for users that are right-handed. As shown in the example of FIG. 2, the positionable camera 280 is located on the left-hand side of the device 200. In such an arrangement, utilization of the mouse 205 on the right-hand side may alleviate risk of interference (e.g., from the mouse 205, from a hand, from an arm, etc.).

As an example, a device such as the device 200 may include a left-hand side positionable camera and/or a right-hand side positionable camera. As an example, a device may be configured with sockets that can receive a positionable camera or positionable cameras. In such an example, a user may be able to insert the positionable camera into one of two sockets (e.g., a left-hand side socket and a right-hand side socket). As an example, a device can include two positionable cameras that may be on opposing sides where a user may be able to select whether to use one or both of the positionable cameras (e.g., via a graphical user interface, via settings, via manual deployment, etc.).

Figure 3:
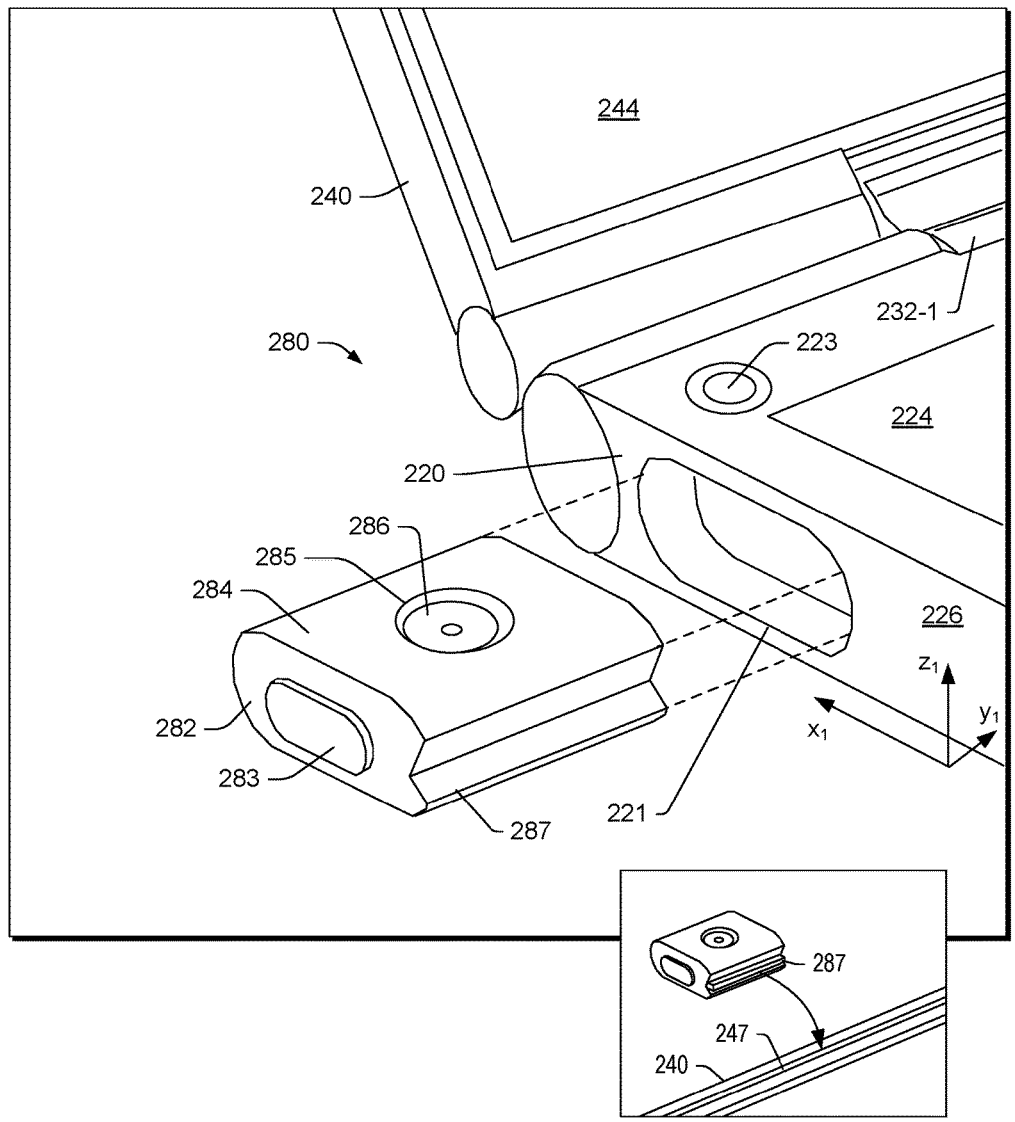
FIG. 3 is an enlarged view of an example of a positionable camera of the device of FIG. 2.

FIG. 3 shows an enlarged view of a portion of the device 200 with the positionable camera 280. In the example of FIG. 3, the keyboard housing 220 includes a side 226 with the camera socket 221 from which the positionable camera 280 can extend for grasping and removal. As shown, the positionable camera 280 can include an end 282, a button 283, a housing 284 with an opening 285 for a camera aperture 286 (e.g., a camera lens, etc.) and a mount 287. As an example, the button 283 may be a single function or a multi-function button. For example, the button 283 may be utilized to turn the positionable camera 280 on or off. As another example, the button 283 may be utilized as a "shutter" button where upon pressing the button 283 the positionable camera 280 captures an image. As a multi-function button, functions may depend on duration of a press of the button 283 (e.g., a short one second press to take a photo and a long three second press to turn the positionable camera 280 off, where, once off, a short one second press may turn the positionable camera 280 back on). Other functions may relate to wireless connection, etc.

In FIG. 3, a coordinate system is illustrated, which may be utilized to describe one or more features. For example, the camera socket 221 may be described as being at or proximate to a hinge end of the keyboard housing 220 as may be at an end of an $x_1$ axis and translatable along a direction aligned with an $y_1$ axis. As shown, the positionable camera 280 may be disposed a distance from the hinge 232-1. As an example, the positionable camera 280 may be extended a distance outwardly from the side 226, which may be defined via the $y_1$ axis, for example, via actuation of the release mechanism 223. As an example, the camera socket 221 may be defined by one or more axes of the coordinate system and the positionable camera 280 may be defined by one or more axes of the coordinate system.

In the example of FIG. 3, the positionable camera 280 has a substantially rectangular profile and may be defined, for example, via x, y and z dimensions. In the example of FIG. 3, the mount 287 is illustrated as including a concave shape that may mate with a convex shape of a mounting surface of a housing. As an example, the mount 287 can include a tongue that can be received by a slot of a mounting surface of a housing. For example, as shown in FIG. 3, a tongue may extend outwardly from the mount 287 (e.g., in a direction along the $x_1$ axis of FIG. 3) and the display housing 240 may include a groove 247 (e.g., or grooves) along one or more edges where the tongue can be press-fit (e.g., interference fit) into the groove 247. One or more of various types of mounts and/or mounting surfaces may be employed for positioning the positionable camera 280 with respect to a housing.

In the example of FIG. 3, the keyboard housing 220 can be made of an opaque material (e.g., a plastic, a metal, an alloy, etc.) such that when the positionable camera 280 is in the undeployed state 201 (see, e.g., FIG. 2), the camera aperture 286 is covered by the opaque material (e.g., directly and/or indirectly).

Figure 4:
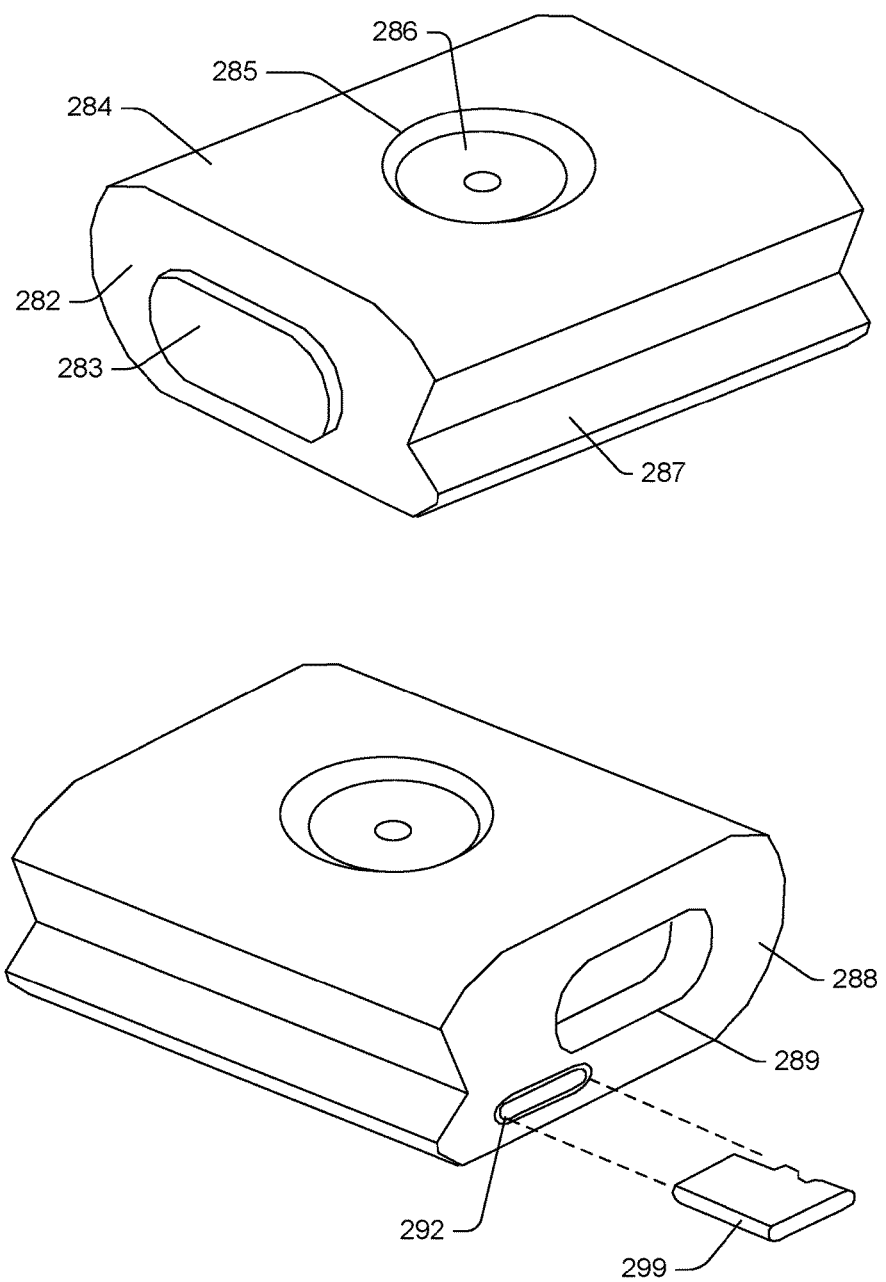
FIG. 4 is a series of diagrams of an example of the positionable camera.

FIG. 4 shows the positionable camera 280 as including a side 288 that can include one or more ports 289 and 292. In the example of FIG. 4, the port 289 may be a data and/or a power port and the port 292 may receive a memory device 299 such as a SD memory card. As an example, the memory device 299 may be inserted at least partially into the port 292 and information read and/or written to memory of the memory device 299. As an example, the memory device 299 may be accessible via the port 289 (e.g., for writing and/or reading of data).

Figure 5:
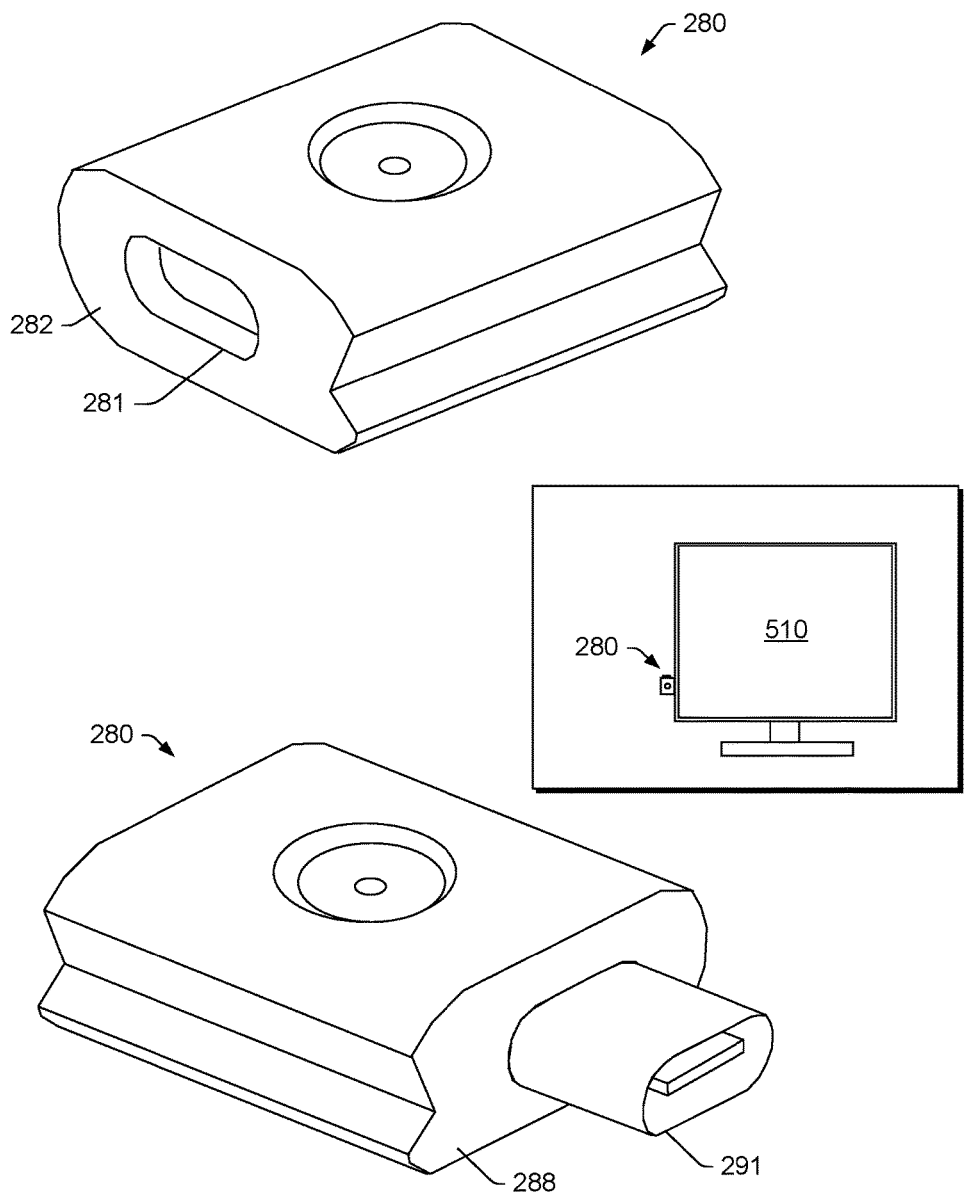
FIG. 5 is a series of diagrams of an example of the positionable camera an example of a positionable camera operatively coupled to a display device.

FIG. 5 shows an example of the positionable camera 280 where the end 282 includes a female connector 281 (e.g., a port) and where the end 288 includes a male connector 291 (e.g., a port). In the example of FIG. 5, the male connector 291 may be received by a female connector of a housing of a computing device such as the keyboard housing 220 of the device 200. For example, the socket 221 of the keyboard housing 220 may include a female connector disposed therein that is operatively coupled to circuitry of the device 200. Where the positionable camera 280 of FIG. 5 is in the undeployed state 201, the female connector 281 may be utilized as a port of the device 200. As an example, the cross-sectional profile of the positionable camera 280 may be approximately the same as a plug end of a cable that includes a male connector such that when the positionable camera 280 is in the deployed state 203, an internal female connector disposed within the socket 221 may be utilized by inserting the male connector of the plug end of the cable into the socket 221 and into the female connector. In such an example, another end of the cable may include a connector that can be connected to one of the connectors 281 and 291 of the positionable camera 280.

As an example, the female connector 281 and/or the male connector 291 may be utilized for connecting the positionable camera 280 to a display device. For example, as shown in FIG. 5, the connector 291 may be a male HDMI connector that can be directly (e.g., or indirectly via a cable) coupled to a female HDMI connector of a display device 510. As mentioned, the positionable camera 280 can include wireless communication circuitry, which may, for example, allow for remote control of the positionable camera 280 with respect to rendering of information via a display of a display device (e.g., a TV, a monitor, etc.).

As mentioned, the positionable camera 280 can include wireless display circuitry such as, for example, the MIRACAST® circuitry. In such an example, the male connector 291 may be a male HDMI connector that can be directly and/or indirectly (e.g., via a cable) coupled to display device (e.g., via an HDMI connector of the display device such as the display device 510 of FIG. 5). In such an example, the positionable camera 280 may operate as a wireless display dongle that can receive information wirelessly that can be rendered to a display of the display device. For example, the device 200 can include wireless display circuitry that can establish a session with wireless display circuitry of the positionable camera 280 such that the device 200 can cause rendering of information to a display of a display device via the positionable camera 280 (e.g., as operatively coupled to the display device).

Figure 6:
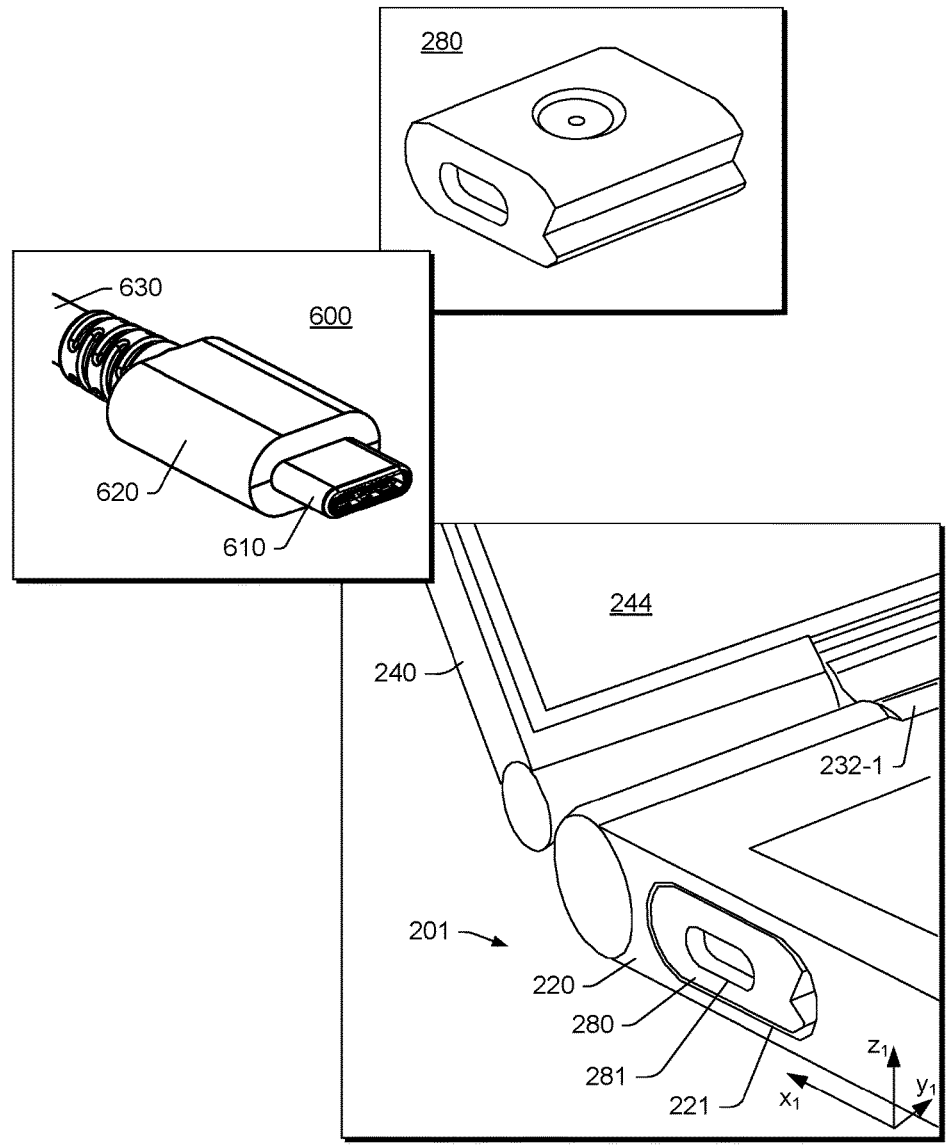
FIG. 6 is a series of diagrams of an example of the positionable camera, the device of FIG. 2 and an example of a cable.

FIG. 6 shows the example of the positionable camera 280 of FIG. 5 along with a cable 600 that includes a male connector 610, a plug end 620 and a cable portion 630, which can extend to another plug end (e.g., with a male connector, a female connector, etc.). In the undeployed state 201, the male connector 610 of the cable 600 may be inserted into (e.g., received by) the port 281 of the positionable camera 280. As mentioned, a plug end may be shaped for receipt by the socket 221. For example, when the positionable camera 280 is in the deployed state 203, the plug end 620 may be received by the socket 221 and the male connector 610 may be inserted into an internal female connector within the keyboard housing 220. As an example, the positionable camera 280 may be tethered to the keyboard housing 220 via the cable 600 where, for example, a male connector or a female connector at an opposing end of the cable 600 may be coupled to one of the ports 281 and 289 of the positionable camera 280.

Figure 7:
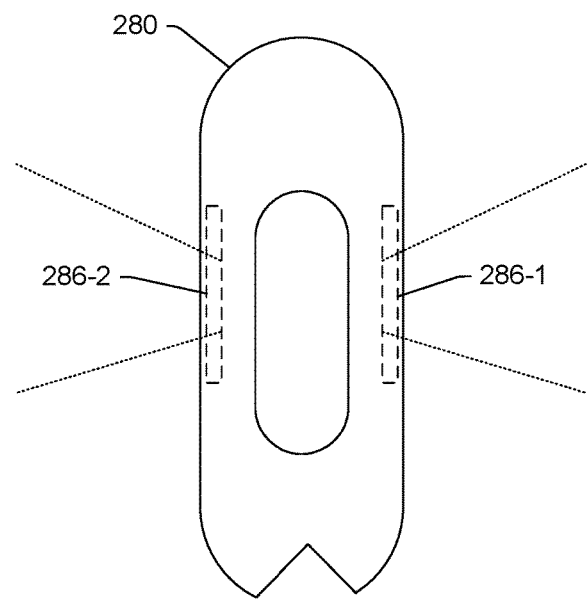
FIG. 7 is a series of diagrams of an example of the positionable camera that includes two sensors.
Figure 7:
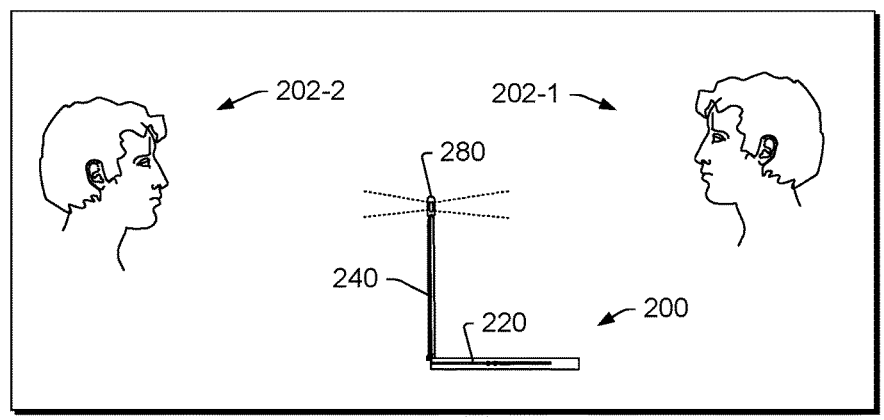

FIG. 7 shows an example of the positionable camera 280 that includes two camera apertures 286-1 and 286-2. For example, the positionable camera 280 of FIG. 7 can include two image sensors. In such an example, the positionable camera 280 may be utilized for imaging two individuals 202-1 and 202-2 where one individual is to one side of the display housing 240 and where the other individual is to an opposing side of the display housing 240. In such an example, the two individuals may be participating in a videoconference with one or more other people at one or more remote locations.

Figure 8:
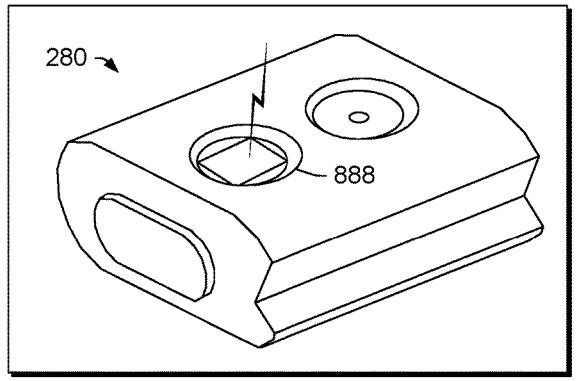
FIG. 8 is a series of diagrams of an example of the positionable camera that includes a flash, an example of the positionable camera that includes a microphone, and examples of the positionable camera that includes at least one adjustment mechanism.
Figure 8:
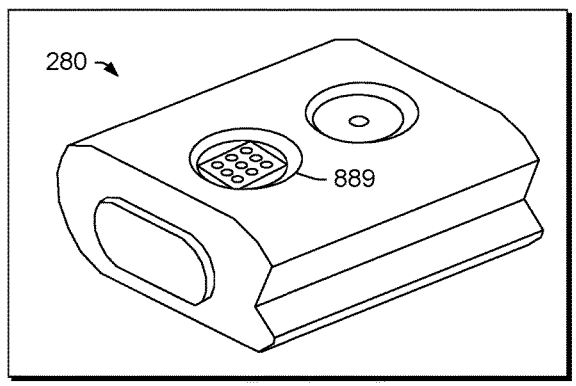
Figure 8:
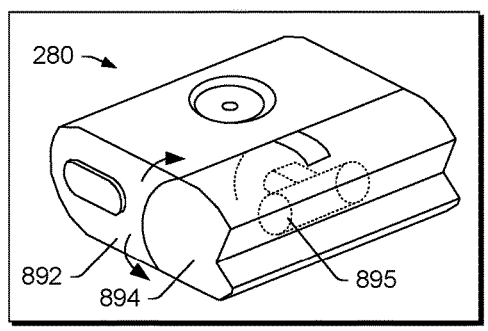
Figure 8:
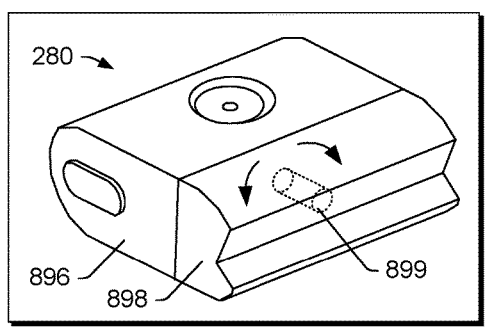

FIG. 8 shows an example of the positionable camera 280 that includes a light 888, which may be, for example, a flash (e.g., a strobe, etc.). In such an example, the light 888 may be activated depending on ambient light. For example, in low light situations, the light 888 may be activated (flashed) when an image is captured.

FIG. 8 shows an example of the positionable camera 280 that includes a microphone 889. As an example, the positionable camera 280 may acquire image data via an image sensor and audio data via the microphone 889. Such image data and/or audio data may be communicated to local memory (e.g., a memory card, etc.), to a device via a wire or a wireless interface, etc.

FIG. 8 shows an example of the positionable camera 280 that includes a camera portion 892 and a mount portion 894 where an adjustment mechanism allows for adjustment of a camera viewing angle. Such a mechanism can include cylindrical surfaces where the camera portion 892 can include a concave cylindrical surface and the mount portion 894 can include a convex cylindrical surface or vice versa. As an example, a stem 895 of one portion can be disposed in a socket of the other portion where the stem 895 can couple the portions 892 and 894. In such an example, a longitudinal axis may be defined by the cylindrical surfaces (e.g., partial cylindrical surfaces) where adjustment can be angular adjustment about the longitudinal axis (e.g., a hinge joint adjustment mechanism). As an example, the camera portion 892 may be adjusted from a neutral position (e.g., as shown in FIG. 8) forwardly by about 90 degrees and may be adjusted from the neutral position rearwardly by about 90 degrees.

FIG. 8 shows an example of the positionable camera 280 that includes a camera portion 896 and a mount portion 898 where an adjustment mechanism allows for adjustment of a camera viewing angle. Such a mechanism can include planar surfaces. As an example, a stem 899 of one portion can be disposed in a socket of the other portion where the stem 899 can couple the portions 896 and 898. In such an example, a longitudinal axis may be defined by the stem where adjustment can be angular adjustment about the longitudinal axis. For example, the camera portion 896 may be rotated at least 180 degrees about the stem (e.g., from front face to rear facing). As an example, a housing can include a stem socket (e.g., a bore) that can receive at least a portion of the stem 899, for example, where the mount portion 898 may be detachable from the camera portion 896.

As an example, a positionable camera can include a ball and a socket adjustment mechanism where one portion of the positionable camera includes the ball (e.g., or is fixed to the ball) and another portion of the positionable camera includes the socket where the ball is disposed at least in part in the socket to form a ball and socket joint (e.g., a spheroidal joint). In such an example, the camera portion may be adjusted in various angular directions (e.g., up/down and back/forth).

Figure 9:
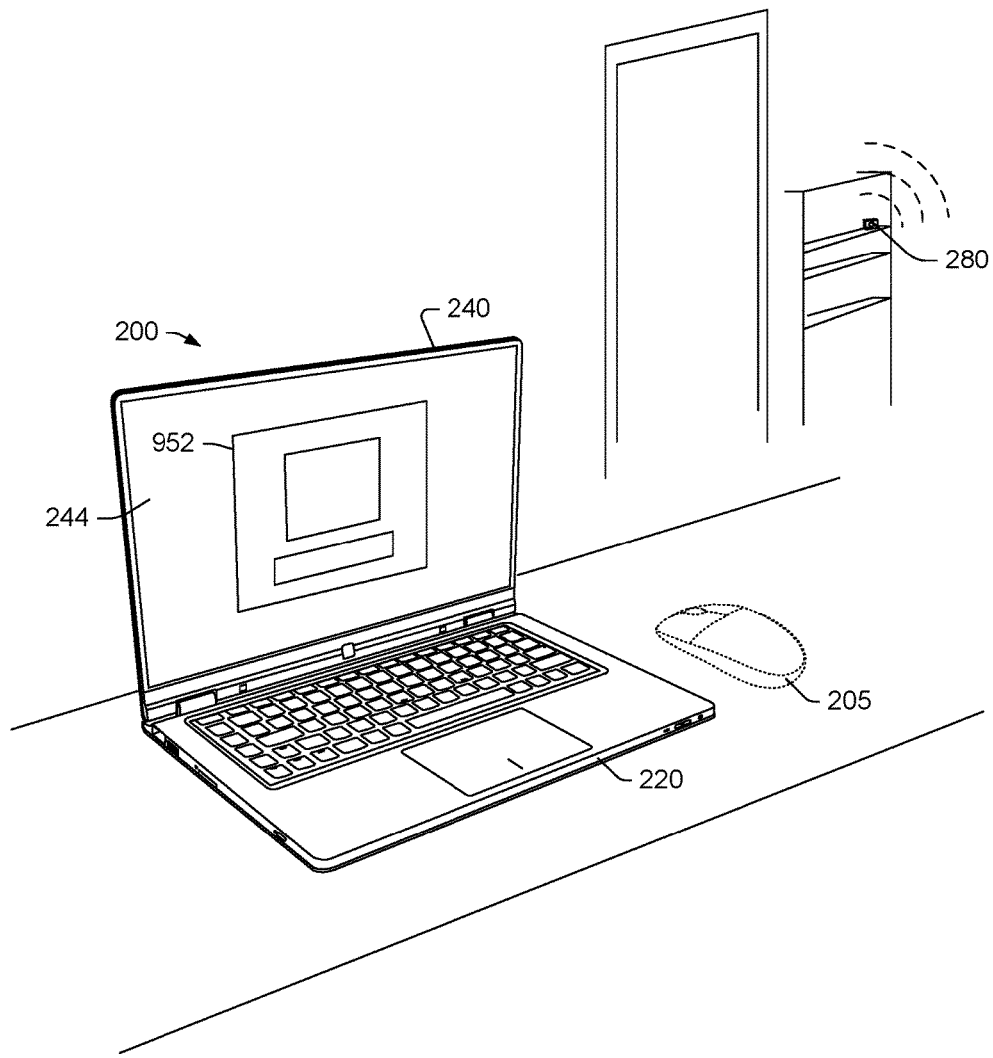
FIG. 9 is a diagram of an example scenario for locating the positionable camera.

FIG. 9 shows an example of the device 200 as including a graphical user interface 952 rendered to the display 244 of the display housing 240. The GUI 952 may be part of a locating application that can be utilized to cause the positionable camera 280 to issue a notification (e.g., a visual notification via a light, an audio notification via a speaker or piezo component, etc.). As an example, the GUI 952 may render imagery captured by the positionable camera 280, which may assist a user in locating the positionable camera 280. In the example of FIG. 9, the device 200 may issue a wireless signal that can be received via wireless circuitry of the positionable camera 280 that can cause the positionable camera 280 to actuate a light via an LED or other light emitter and/or to actuate audio via a speaker or piezo component. As an example, a positionable camera can include a battery or batteries that can provide electrical power to circuitry of the positionable camera, which can include camera circuitry and one or more other types of circuitry (e.g., wireless communication circuitry, LED circuitry, audio circuitry, memory circuitry, bus circuitry, etc.).

Figure 10:
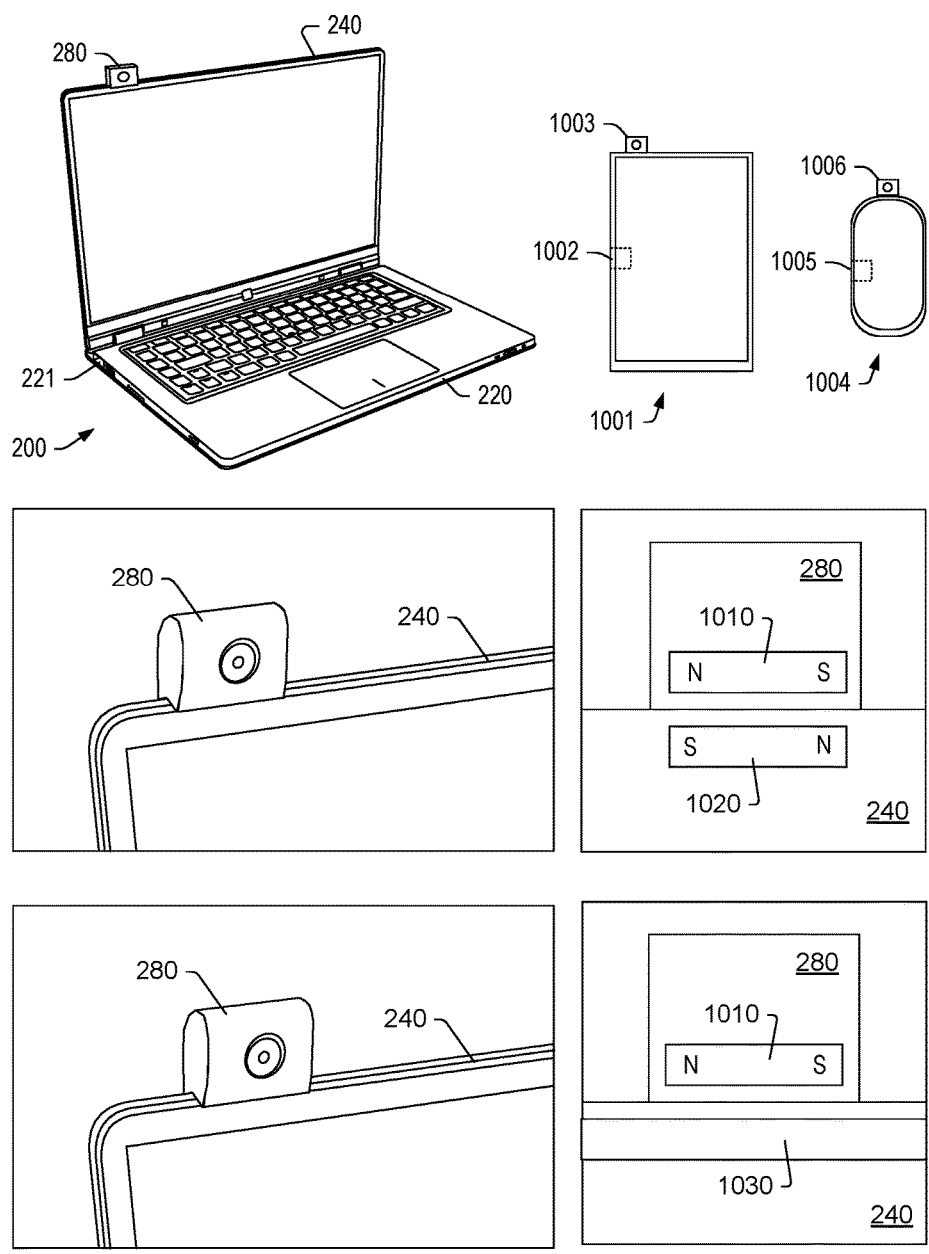
FIG. 10 is a series of diagrams of examples of mechanisms that position the positionable camera with respect to one or more types of devices.

FIG. 10 shows the device 200 as including a mechanism that can be utilized to position the positionable camera 280 on the display housing 240. FIG. 10 also shows an example of a tablet 1001 (e.g., a tablet form factor device) that includes a camera socket 1002 and a positionable camera 1003 and an example of a smartphone 1004 (e.g., a smartphone form factor device) that includes a camera socket 1005 and a positionable camera 1006. The positionable cameras 1003 and 1006 may include various features of one or more examples of the positionable camera 280 and the camera sockets 1002 and 1005 may include various features of one or more examples of the camera socket 221. The tablet 1001 and/or the smartphone 1004 may include various features of one or more examples of the device 200.

As an example, a tablet can include a processor; memory operatively coupled to the processor; a display operatively coupled to the processor; a camera that includes circuitry that operatively couples to the processor and that includes a mount that positions the camera in a deployed state; and a housing that includes a camera socket that receives the camera in an undeployed state. In such an example, the housing can house the processor and the display and the housing can include a mounting surface that cooperates with the mount of the camera to position the camera in the deployed state. For example, a user may remove the camera from the camera socket of the housing of the tablet and position the camera on the mounting surface of the housing of the tablet via the mount of the camera.

As an example, a smartphone can include a processor; memory operatively coupled to the processor; a display operatively coupled to the processor; a camera that includes circuitry that operatively couples to the processor and that includes a mount that positions the camera in a deployed state; and a housing that includes a camera socket that receives the camera in an undeployed state. In such an example, the housing can house the processor and the display and the housing can include a mounting surface that cooperates with the mount of the camera to position the camera in the deployed state. For example, a user may remove the camera from the camera socket of the housing of the smartphone and position the camera on the mounting surface of the housing of the tablet via the mount of the camera.

As an example, a laptop can include a processor; memory operatively coupled to the processor; a display operatively coupled to the processor; a camera that includes circuitry that operatively couples to the processor and that includes a mount that positions the camera in a deployed state; and a housing that includes a camera socket that receives the camera in an undeployed state. In such an example, the housing may be a keyboard housing that is operatively coupled to a display housing via one or more hinge assemblies where at least one of the housings includes the processor and where the display housing includes the display and includes a mounting surface that cooperates with the mount of the camera to position the camera in the deployed state. For example, a user may remove the camera from the camera socket of the keyboard housing of the laptop and position the camera on the mounting surface of the housing of the laptop via the mount of the camera.

In the example of FIG. 10, the mechanism includes at least one magnet 1010 and 1020. As shown, the magnets 1010 and 1020 may interact with each other via an attractive force to secure the positionable camera 280 on the display housing 240. As an example, the display housing 240 can include one or more of the magnets 1020, which may be fixed or positionable along a bezel portion of the display housing 240. As an example, the positionable camera 280 can include at least one magnet 1010 and the display housing 240 can include at least one strip of magnetic material 1030 where the at least one magnet 1010 can establish an attractive force with respect to the strip of magnetic material 1030. In such an example, the positionable camera 280 may be adjustable laterally along the strip of magnetic material 1030. As an example, the positionable camera 280 may be flipped to be rearward facing. In such an example, the display housing 240 may include one or more oriented magnets to accommodate the magnet 1010 of the positionable camera 280. For example, a series of spaced north and south poles may be established along a bezel where south and north poles of the positionable camera 280 may be aligned thereto to secure the positionable camera 280 to the display housing 240.

Figure 11:
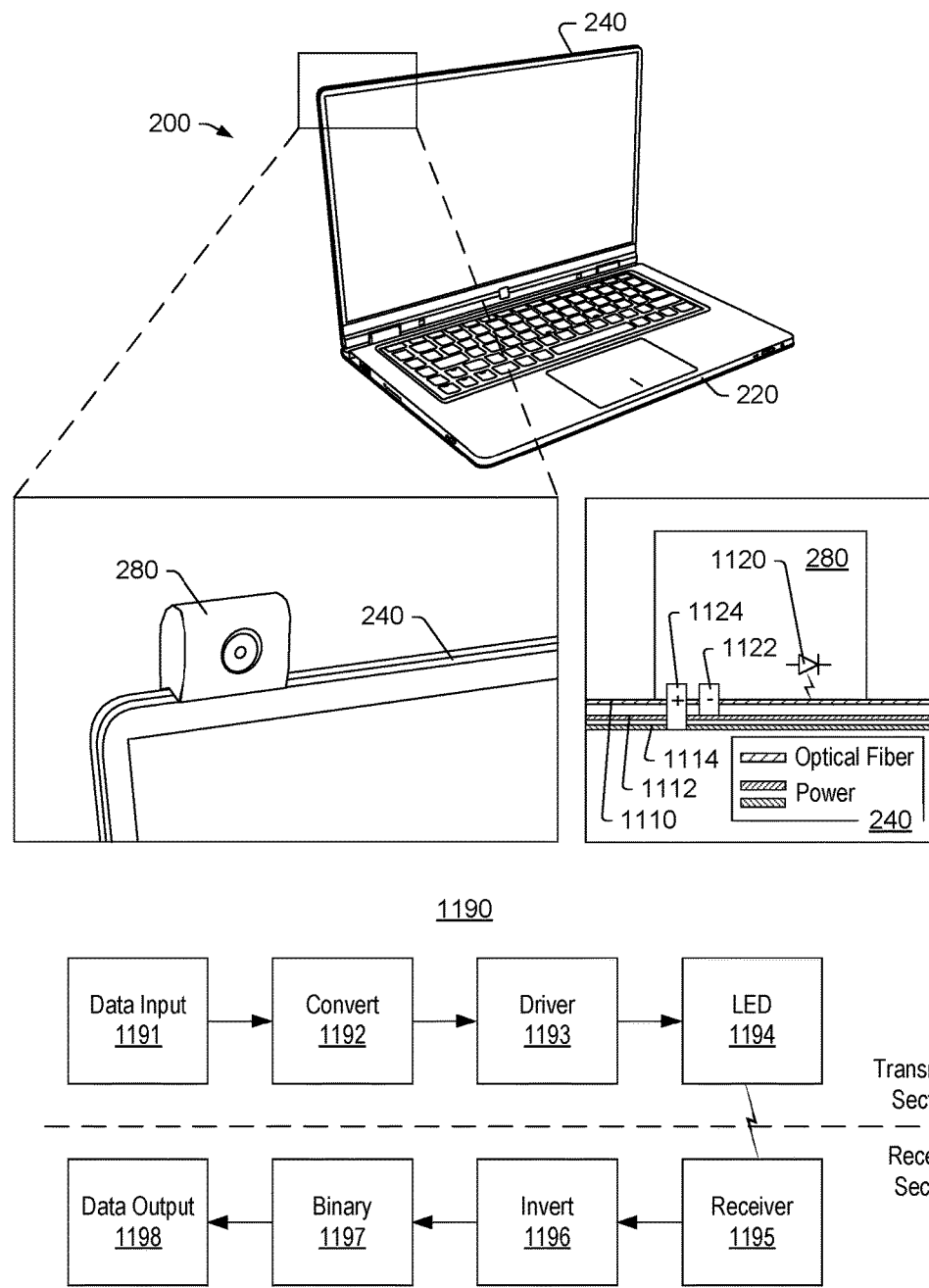
FIG. 11 is a diagram of an example of the device and an example of the positionable camera along with an optical communication method.

FIG. 11 shows an example of the device 200 as including optical communication circuitry. For example, the display housing 240 can include an optical fiber 1110 and the positionable camera 280 can include an emitter 1120 (e.g., an LED). In the example of FIG. 11, the display housing 240 can include power connectors 1112 and 1114 (e.g., tabs, rails, etc.) and the positionable camera 280 can include power connectors 1122 and 1124. In such an example, the positionable camera 280 may be powered by and/or recharged by the power connectors 1112 and 1114 of the display housing 240. The connectors 1112, 1114, 1122 and 1124 may be referred to as a power interface or power interfaces (e.g., a power interface of the display housing 240 and a power interface of the positionable camera 280).

FIG. 11 also shows an example of a method 1190 that includes a data input block 1191, a conversion block 1192 for converting input data, a driver block 1193 for driving an LED 1194, a receiver 1195 for receiving emissions of the LED 1194, an inverter block 1196 for inverting signals from the receiver 1195, a binary representation block 1197 for representing inverted signals in a binary format and an output block 1198 for outputting data in the binary format. As an example, the positionable camera 280 can include the LED 1194, conversion circuitry per the conversion block 1192 and driver circuitry per the driver block 1193. As an example, the device 200 can include the receiver 1195 (e.g., optically coupled to the optical fiber 1110), inversion circuitry per the inverter block 1196 and binary representation circuitry per the binary representation block 1197. As shown, various blocks and/or components may be part of a transmitter section and various blocks and/or components may be part of a receiver section.

Figure 12:
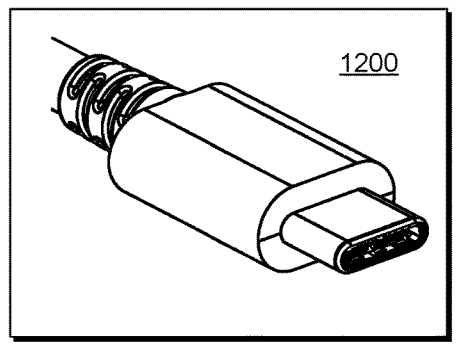
FIG. 12 is a diagram of an example of a plug, an example of a pin configuration and examples of functions.
Figure 12:
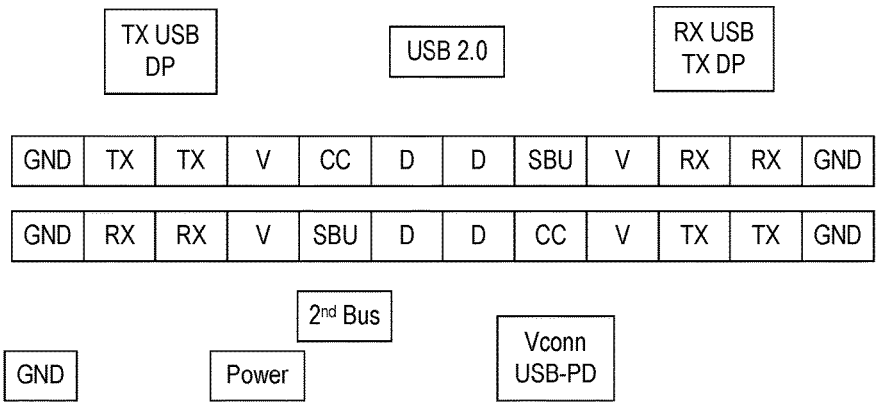
Figure 12:
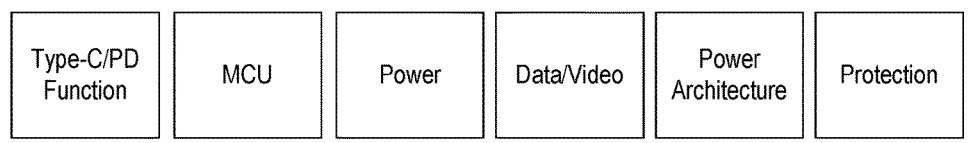

FIG. 12 shows an example of a cable 1200, a pin configuration 1210 and various functions 1220 that may be implemented using the pin configuration 1210.

The cable 1200 is shown as a USB Type-C cable with a male connector. The male connector can be dimensioned approximately 0.3 inch by approximately 0.1 inch. As an example, a connector may be a Micro-B connector with dimensions of approximately 0.28 inch by 0.06 inch. The USB Type-C is reversible, meaning that it can be plugged in upside down and work.

As to the functions 1220, these can include Type-C and/or power delivery (PD) function, microcontroller (MCU), power, data that can include video, power architecture and protection (e.g., security).

Figure 13:
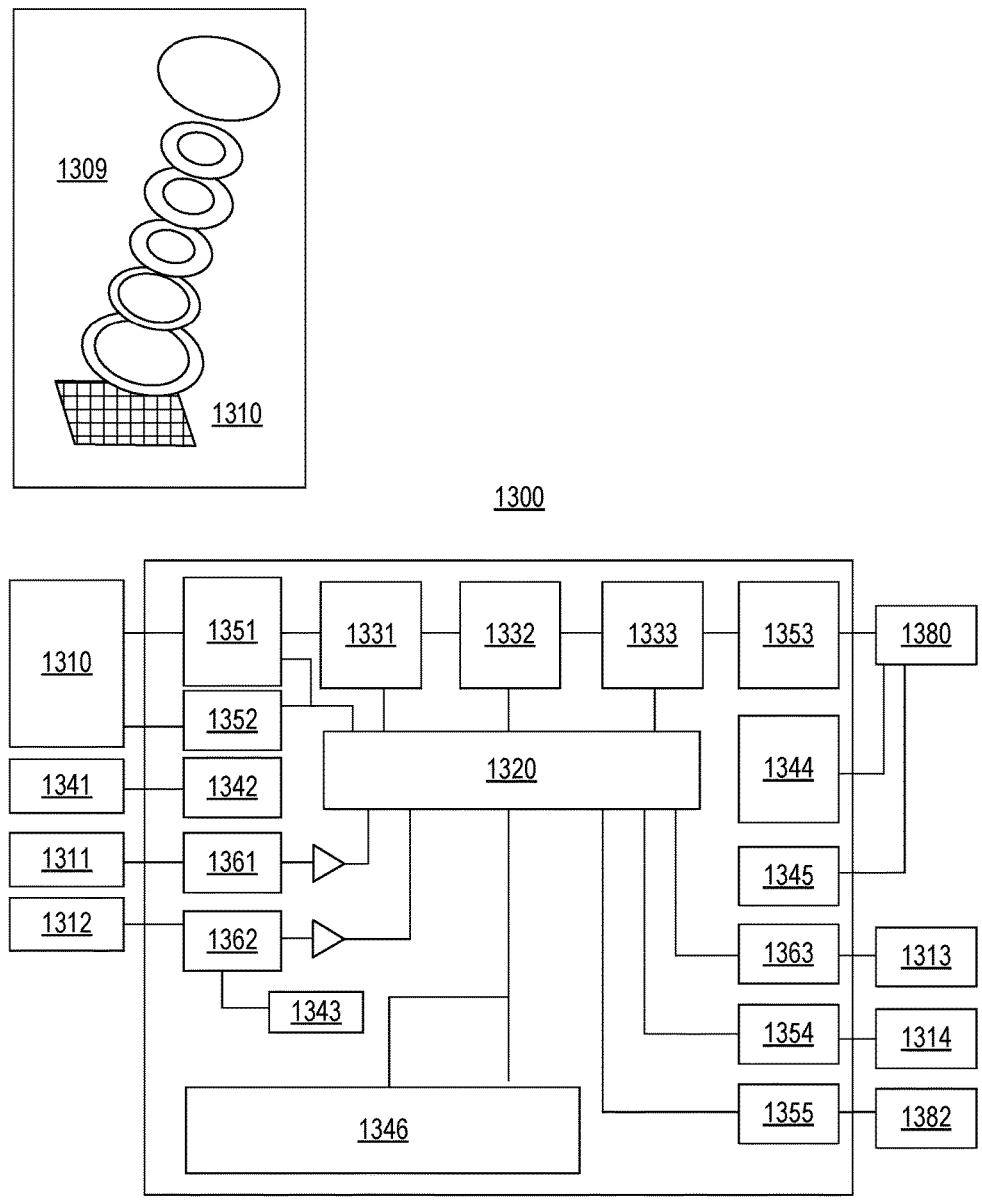
FIG. 13 is a series of diagrams of examples of components.

FIG. 13 shows an example of a camera assembly that includes an image sensor 1310 and one or more lenses 1309 in an exploded view. FIG. 13 also shows circuitry 1300 as including various components. The components may be grouped, for example, as peripherals such as an image sensor 1310, a microphone 1311, a photo sensor 1312, one or more IR LEDs 1313 and a digital photocell 1314; as registers such as registers 1320; as image processors such as a scaler 1331, a compression component 1332 (e.g., JPEG, etc.), and a frame buffer 1333; as power and/or clock components such as a crystal clock 1341, an Xtal clock 1342, a battery supply 1343, a power down memory retention component 1344, and a power down component 1345; and digital interface components such as a BT.656 format component 1351, an I²C master bus (e.g., SCCB) component 1352, one or more I²Cs and/or SPIs and/or UART components 1353, an I²C master component 1354 and one or more GPIOs component 1355. As shown, the circuitry 1300 can be operatively coupled to a host processor 1380 and a sensor host/status component 1382. As an example, a device can include one or more of the circuitry components of the circuitry 1300. For example, the device 200 may include one or more of the circuitry components of the circuitry 1300.

As an example, a positionable camera can include an image sensor or image sensors. As an example, a positionable camera can include a microphone. As an example, a positionable camera can include a rechargeable battery. As an example, a positionable camera can include wireless communication circuitry.

As an example, a device can include a processor; memory operatively coupled to the processor; a display operatively coupled to the processor; a camera that includes circuitry that operatively couples to the processor and that includes a mount that positions the camera in a deployed state; and a housing that includes a camera socket that receives the camera in an undeployed state. In such an example, the device can include wireless communication circuitry where the camera is operatively coupled to the processor via the wireless communication circuitry.

As an example, a camera can include a port, which can be a serial port. For example, a camera can include a USB port. Such a port may be utilized when the camera is in an undeployed state and/or in a deployed state. For example, a plug of a cable may be inserted into a port of a camera in the undeployed state where the camera may be a pass-through to a port (e.g., interface) of the device (e.g., disposed in the camera socket) and a plug of a cable may be inserted into a port of the camera in a deployed state to tether the camera for purposes of data transfer and/or power.

As an example, a camera can include memory, which may be removable memory such as memory card (e.g., an SD memory card). For example, a camera can include a slot (e.g., a port) that can receive a memory card.

As an example, a camera may be utilized as a wireless display dongle. For example, a camera can include an HDMI port, which may be a male or a female port. As an example, a camera can include media player circuitry where data stored in memory of the camera or wirelessly transmitted to the camera can be controllably rendered to a display device. In such an example, a device can include a remote control graphical user interface (GUI) that allows a user to control the camera as operatively coupled to a display device (e.g., via an HDMI port, etc.). As an example, a camera can include an actuation button or buttons that can be utilized to control rendering circuitry of the camera where rendering occurs via wired or wireless data transfer to a display device.

As an example, a camera can include a battery, which may be a rechargeable battery. As an example, a camera can include contactless charging circuitry such as inductive charging circuitry. In such an example, a housing of a device can include an induction coil that generates an alternating electromagnetic field and a camera can include an induction coil that can harvest power from the electromagnetic field and converts it into electric current to charge one or more batteries (e.g., or other type of power storage unit). As an example, a camera socket can include battery charging circuitry for charging a battery of a camera when the camera is disposed in the socket. In such an example, the battery charging circuitry may be wireless battery charging circuitry.

As an example, a device can include a clip as a part of a mount. Such a clip may include a spring such that an object can be clamped between two surfaces of the clip where at least one of the surfaces is biased by the spring.

As an example, a camera can include an actuation button. Such a button may be a single function button or a multi-function button. As an example, an actuation button can be a shutter button that causes a camera to acquire an image as a digital pixel image (e.g., a digital photograph). As an example, an actuation button may be utilized to commence videography and to terminate videography. As an example, a camera may include one or more LEDs that indicate a state of operation of the camera (e.g., currently in a video mode, in a data transfer mode, in a low battery power mode, in a "leash" distance mode with respect to wireless circuitry, etc.).

As an example, a camera can include a microphone, which may be operable for purposes of videoconferencing or other video with an audio track. As an example, a camera can include voice actuation circuitry that can be actuated based on voice commands as received via a microphone of the camera.

As an example, a camera can include a light, which may be a flash or a video light to help illuminate a scene. Such a light can include one or more LEDs.

As an example, a camera can include locating circuitry. In such an example, the locating circuitry can include audible locating circuitry, light-emitting locating circuitry or audible locating circuitry and light-emitting locating circuitry.

As an example, a housing can include one or more mounting surfaces. As an example, a mounting surface can be an edge of the housing. In such an example, the housing can be a display housing that includes a display. As an example, such a housing may be a display housing of a laptop (e.g., laptop computer), a tablet (e.g., a tablet computer), a smartphone, etc.

As an example, a mounting surface can include at least one electrical contact and/or at least one optical interface operatively coupled to optical communication circuitry (see, e.g., FIG. 11). As an example, a device can include a mounting surface that cooperates with a mount of a camera in a deployed state of the camera with respect to a camera socket of a housing of the device. In such an example, the mounting surface can include at least one electrical contact and/or at least one optical interface operatively coupled to optical communication circuitry.

As an example, a camera can include a magnetic mount. As an example, a mounting surface can include a magnetic material. As an example, a magnetic material can be a magnetic or, for example, a material that includes iron. As an example, a mount of a camera can include a magnetic material and a mounting surface of a housing can include a magnetic material where the mount and the mounting surface include at least one magnet. A mounting surface of a housing that includes at least one magnetic can include a magnet or magnets covered by the mounting surface where magnet field lines emanate at least to the mounting surface.

As an example, a device can include a tether, which may include one or more electrical wires, one or more optical fibers, etc. Such a tether may couple to a camera and to a housing. As an example, a serial bus cable may be utilized as a tether. As an example, a device can include a retraction mechanism coupled to a tether. For example, consider a reel that can rotate to take up the tether and deploy the tether. Such a reel may be operatively coupled to a spring and operate as a retractable cord reel where the tether is a cord.

As an example, a housing can be a display housing. As an example, a device can include a display housing and a keyboard housing. As an example, a display housing and/or a keyboard housing can include a camera socket.

As an example, a device can include two or more housing. As an example, a device can include housings that are operatively coupled via a hinge assembly (e.g., a hinge assembly that operatively couples two housings).

As an example, a camera may be inoperable for acquiring images in an undeployed state. As an example, a camera may be air-gapped as to data transfer and/or control when in an undeployed state and, for example, able to receive power for purposes of charging a battery or batteries of the camera.

As an example, a device may include one or more cameras and one or more camera sockets. As an example, where a device includes two positionable cameras, the positionable cameras may be operable in a stereoscopic mode.

As an example, a device can include circuitry that launches a communication application responsive to a transition of a camera from an undeployed state to a deployed state. For example, a sensor, a detector, etc. may be located at a camera socket of a housing where presence and/or absence of camera in the camera socket can be sensed or detected. Such an approach may issue a signal that causes the device to instantiate a communication application, which may be, for example, a videoconferencing application.

As an example, a camera may be a water-tight camera. For example, a camera may be submersible in water to a rated depth such as, for example, about a meter to about 100 meters or more. In such an example, the camera can include seals that hermetically seal the camera from intrusion of water. In water, pressure increases about one atmosphere for every 10 meters of water depth. As an example, a camera can include a case such as a case of a diving watch. For example, consider a case made out of a material such as grade 316L or 904L austenitic stainless steel or another type of steel alloy, titanium, ceramic or synthetic resin or plastic. As an example, a camera may be water-resistant according to ISO 2281 or a camera may be constructed to meet a higher standard as to water intrusion such as ISO 6425.

As an example, A device can include a processor; memory operatively coupled to the processor; a display operatively coupled to the processor; a camera that includes circuitry that operatively couples to the processor and that includes a mount that positions the camera in a deployed state; and a housing that includes a camera socket that receives the camera in an undeployed state. In such an example, the camera can include a port where, for example, the port is operable to receive a plug in the undeployed state of the camera to electrically couple the plug to circuitry of the housing. For example, the plug may be a plug of a USB cable (e.g., Type-C or other type), an HDMI cable, or another type of cable. As an example, a camera may operate as a pass-through component in an undeployed state as disposed in a camera socket of a housing where the camera includes a port (e.g., a female connector) accessible from a side of the housing that can receive a plug (e.g., a male connector) where the plug can be electrically coupled to circuitry of the housing via the camera. Such circuitry may be operatively coupled to a processor carried by the housing.

As an example, a device can include a processor; memory operatively coupled to the processor; a display operatively coupled to the processor; a camera that includes circuitry that operatively couples to the processor and that includes a mount that positions the camera in a deployed state; a first housing; a second housing; and a hinge assembly that operatively couples the first and second housings where the first and second housings include a mounting surface that cooperates with the mount of the camera in the deployed state and a camera socket that receives the camera in an undeployed state. For example, such a device can be a laptop that includes a display housing that includes the mounting surface and a keyboard housing that includes the camera socket where the display housing and the keyboard housing are operatively coupled by one or more hinge assemblies. As an example, the circuitry of the camera that operatively couples the camera to the processor can include wired circuitry for transmission of information and/or wireless circuitry for transmission of information. For example, the processor can be housed by the display housing or by the keyboard housing where a wired interface can allow for operative coupling and/or a wireless interface can allow for operative coupling.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 14:
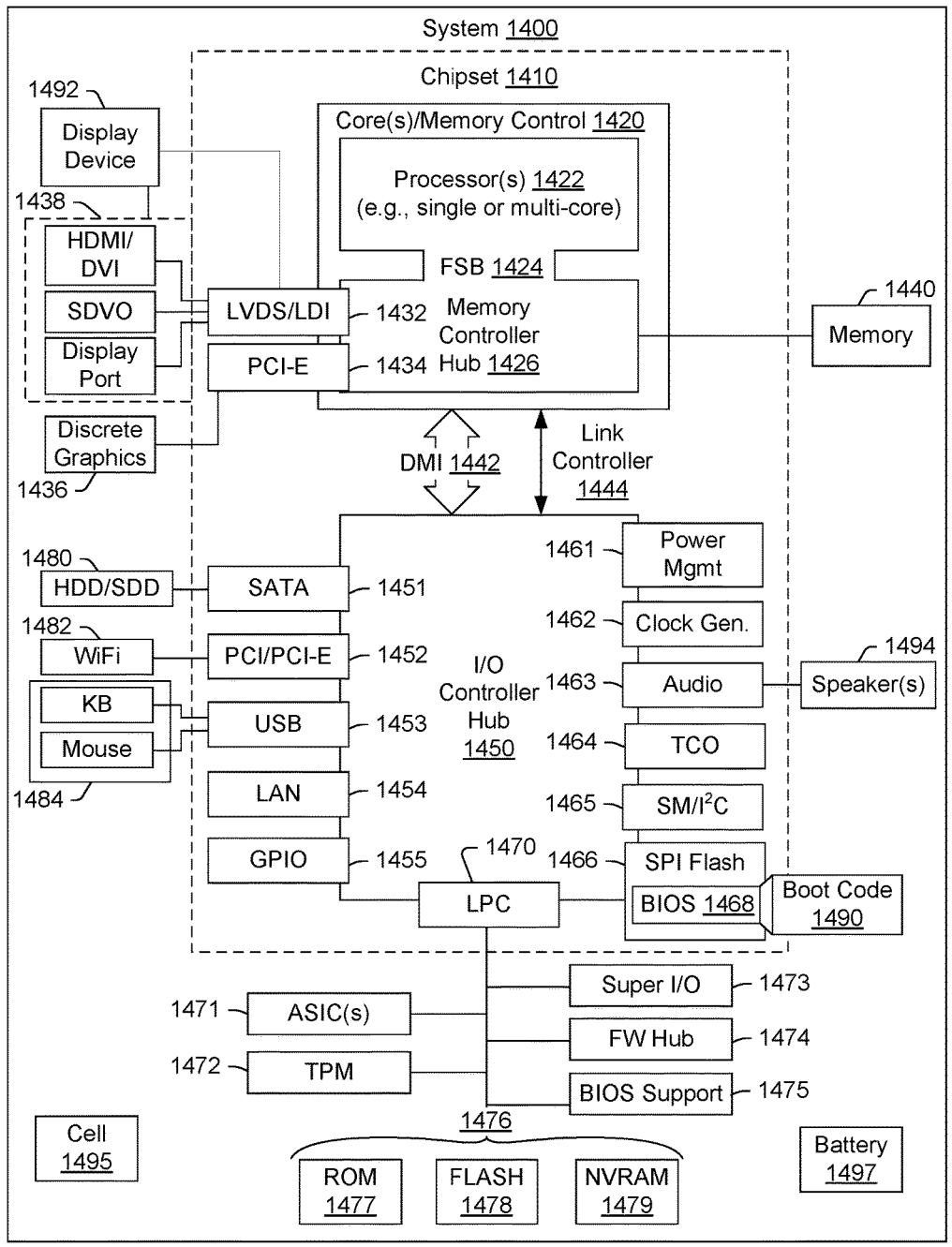
FIG. 14 is a diagram of an example of a system that includes one or more processors.

While various examples of circuits or circuitry have been discussed, FIG. 14 depicts a block diagram of an illustrative computer system 1400. The system 1400 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1400. As an example, the device 200 can include various features of the system 1400. As an example, the tablet 1001 can include various features of the device 200 and/or the system 1400. As an example, the smartphone 1004 can include various features of the device 200 and/or the system 1400.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
    a processor;
    memory operatively coupled to the processor;
    a display operatively coupled to the processor;
    a camera that comprises circuitry that operatively couples to the processor and that comprises a mount that positions the camera in a deployed state;
    a first housing;
    a second housing; and
    a hinge assembly that operatively couples the first and second housings and wherein the first and second housings comprise a mounting surface that cooperates with the mount of the camera in the deployed state and a camera socket that receives the camera in an undeployed state.

2. The device of claim 1 comprising wireless communication circuitry wherein the camera operatively couples to the processor via the wireless communication circuitry.

3. The device of claim 1 wherein the camera comprises an actuation button.

4. The device of claim 1 wherein the camera comprises a microphone.

5. The device of claim 1 wherein the camera comprises a light.

6. The device of claim 1 wherein the camera comprises a battery.

7. The device of claim 6 wherein the camera socket comprises battery charging circuitry for charging the battery of the camera.

8. The device of claim 1 wherein the mounting surface that cooperates with the mount of the camera in the deployed state comprises at least one electrical contact.

9. The device of claim 1 wherein the mounting surface that cooperates with the mount of the camera in the deployed state comprises at least one optical interface operatively coupled to optical communication circuitry.

10. The device of claim 1 wherein the mount of the camera comprises a magnetic material and wherein the mounting surface that cooperates with the mount of the camera in the deployed state comprises a magnetic material wherein the mount of the camera and the mounting surface that cooperates with the mount of the camera in the deployed state comprise at least one magnet.

11. The device of claim 1 comprising a tether coupled to the camera and to the first housing, the second housing or the hinge assembly.

12. The device of claim 1 wherein the second housing is a display housing that houses the display.

13. The device of claim 1 comprising a keyboard wherein the first housing is a keyboard housing.

14. The device of claim 1 comprising circuitry that launches a communication application responsive to a transition of the camera from the undeployed state to the deployed state.

15. The device of claim 1 wherein the camera comprises a port.

16. The device of claim 15 wherein the port is operable to receive a plug in the undeployed state to electrically couple the plug to circuitry of the first housing, the second housing or the first and second housings.

17. The device of claim 15 wherein the port comprises a multimedia port.

18. The device of claim 1 wherein the second housing comprises the display and wherein the second housing comprises the mounting surface that cooperates with the mount of the camera in the deployed state.

19. The device of claim 18 wherein the first housing comprises the camera socket that receives the camera in an undeployed state.

20. The device of claim 19 wherein the first housing comprises a top surface, a bottom surface and side surfaces, wherein the first housing comprises a keyboard on the top surface and wherein the camera socket that receives the camera in an undeployed state is a side surface socket of one of the side surfaces of the first housing.

* * * * *